Dec. 10, 1968     FUKUICHI FUKUDA     3,415,378
SEWAGE TREATMENT SYSTEM
Filed Feb. 10, 1966
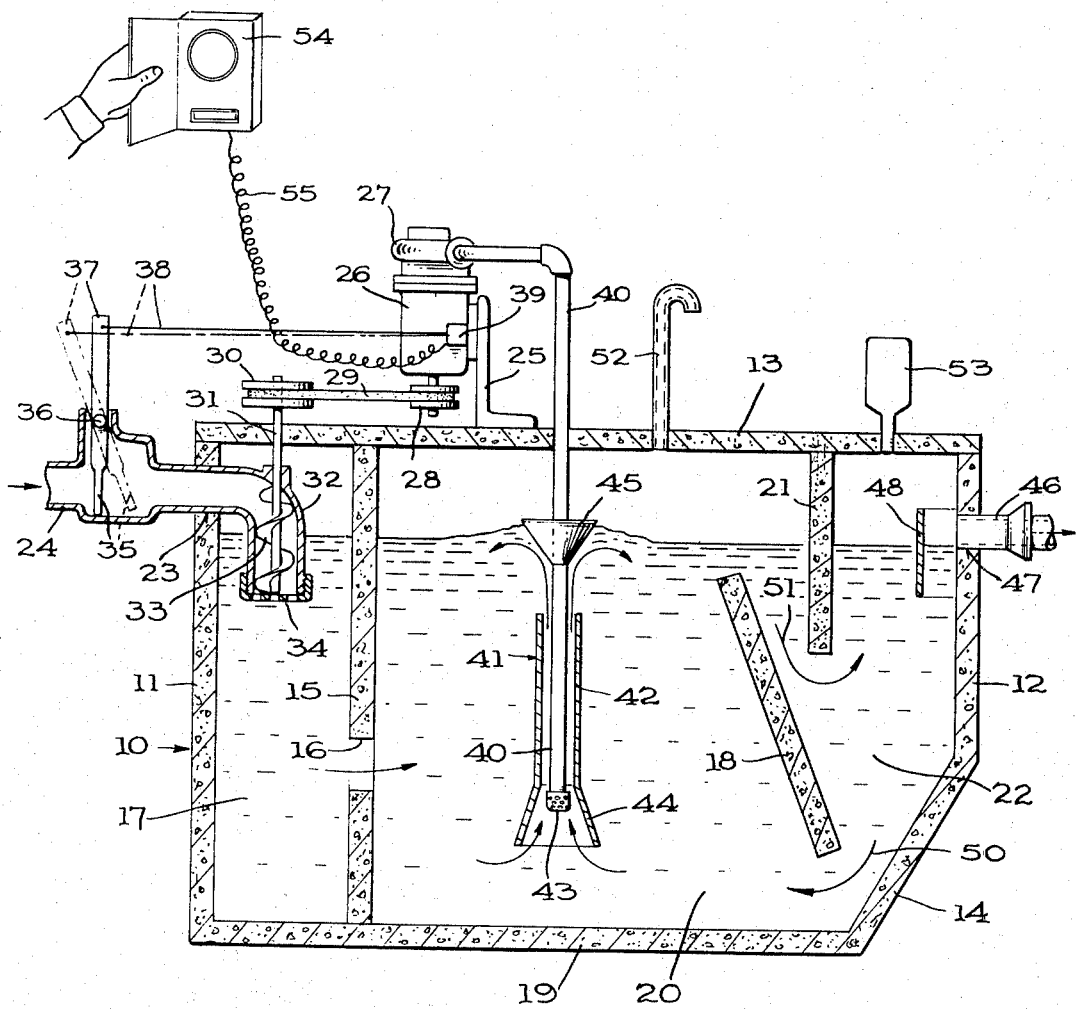
INVENTOR
FUKUICKI FUKUDA
BY
Chandlee Pidgeon
AGENT

United States Patent Office 3,415,378
Patented Dec. 10, 1968

3,415,378
SEWAGE TREATMENT SYSTEM
Fukuichi Fukuda, 12–12 6-chome, Minami-oi,
Shinagawa, Tokyo, Japan
Filed Feb. 10, 1966, Ser. No. 526,569
7 Claims. (Cl. 210—152)

ABSTRACT OF THE DISCLOSURE

The presence of sewage is detected by a sensor in the inflow pipe which causes the operation of a comminuting means and an air supplying means. Comminuted sewage undergoes bacterial treatment in a first compartment and is aerated in a second compartment after which it passes to a third compartment having a divided wall consisting of a substantially vertical baffle and a downwardly inclined baffle separated therefrom so that the effluent follows a tortuous path.

---

This invention relates to a sewage treatment system for domestic use, and in particular to such a means for use in locations where there is no public sewerage system.

Domestic flushing cisterns or tanks for the most part do not have sufficient purifying potential, and often produce undesirable odors. To overcome these disadvantages, I employ the principle of aerobic purifying. I thus provide a system for domestic use at reasonable cost, and free of objectionable odor, which is especially adapted for use in areas where no public water supply or sewerage systems are available.

An object of this invention is the provision of a sewage treatment means wherein the sewage is treated aerobically to an extent that the effluent contains no objectionable solids or odors.

Another object of this invention is the provision of means for comminuting sewage prior to oxidation thereof, to provide greater surface exposure to the oxygen.

A further object of this invention is to provide means for promoting rapid aerobic growth within the fluids being treated.

These and other objects will become apparent upon consideration of the following specification, taken with the accompanying drawing, which together form a complete disclosure of my invention.

The single drawing figure is a longitudinal vertical section through the device of my invention.

Referring now to the figure, the sewage treatment device comprises a tank 10, having suitable side walls, end walls 11 and 12, and a cover 13. The wall 11 is at the input end of the tank 10, and the wall 12 is at the outflow end of the tank. The lower portion 14 of the wall 12 is sloped forwardly, toward the input end, for a purpose later to appear. Spaced a short distance from the end wall 11 is a parallel divider 15 having a passage 16 near its. lower end, and forming a tank or reservoir 17.

Spaced from the divider wall 15 is a sloping wall 18, the upper and lower ends of which are spaced respectively from the cover 13 and the bottom 19 of the tank 10. The space between the walls 15 and 18 forms an aeration compartment 20.

A shield wall or baffle 21 is suspended from the cover 13, and projects downward to some distance below the level of the top of the wall 18. The wall 18, baffle 21 and end wall 12 form a settling compartment 22.

Adjacent the upper end of the end wall 11, there is an opening 23 which receives the sewage discharge pipe 24. A bracket 25 is mounted on the cover 13 and on this bracket I mount a motor 26, having a suitable conventional double-ended shaft. One end of the shaft drives an air pump or compressor 27, while a pulley 28, on the other end of the shaft is connected by means of a belt 29 to the pulley 30 on the shaft 31. The shaft 31 is mounted in an L-shaped extension 32 of the pipe 24 and carries a feed screw 33. Adjacent its lower end, the feed screw terminates adjacent a perforated plate or cap 34, such as in a common meat grinder construction.

Within the pipe 24, there is a detector or feeler plate 35, shown in normal position in solid lines and in detecting posiiton in dotted lines. The detector is pivoted at 36, and the upper end 37 thereof is connected by suitable means 38 to a motor control means 39. Passage of sewage or garbage through the pipe 24 causes operation of the motor 26 to comminute solids in the inflow fluid. Operation of the motor also causes compressed air to flow through the pipe 40 to the aerator 41. The aerator 41 comprises a tube 42 spaced from the pipe 40, and projecting below the lower end thereof. The pipe 40 has a perforated cap 43. The lower end of the pipe 42 is flared as at 44, and on the pipe 40, above the pipe 42, there is an inwardly tapering conical deflector 45. Air passing through the pipe 40 tends to take the shortest path to the surface, and consequently causes a circulation of fluids upwardly through the aerator 41 as shown by the curved arrows. This circulation exposes the fluids and suspended solids to a considerable contact with the oxygen in the air to cause growth and multiplication of the aerobes in order to effect a purifying operation.

An effluent pipe 46 is located in an opening 47 in the upper part of the end wall 12. A baffle 48 adjacent the opening 47 causes the effluent to take a tortuous path, and to drop out suspended solids. Such solids slide down the inclined portion 14 of the wall 12, and pass into the aeration chamber 10, as shown by the arrow 50. The inclined wall 18 and the baffle 21 cause the fluids to take a path indicated by the arrow 51. This causes elimination of some suspended solids.

A breather tube 52 is provided in the cover 13 to maintain a balance between the atmosphere and the air in the tank 10. A drip feed chlorinator 53 is also provided in the cover 13 to provide for the addition of a suitable amount of chlorine to the treated sludge.

In order that sufficient air may be provided to effect thorough aeration of the sewage and sufficient growth of the aerobes, it is preferred that the motor 15 not stop when flow of sewage stops and the detector 35 returns to normal position. To accomplish this, a timer 54 is connected by a suitable conductor 55 to the motor control means 39. Thus the timer can be set so that the compressor operates a sufficient time to effect thorough aeration and purifying of the sewage.

Suitable removable hatches or lids may be provided in the cover 13 permitting access for removal of separated solids which have settled on the bottom 19 of the tank.

I claim:

1. In a system for purifying sewage, a tank having bottom, side and end walls and a removable cover, said tank having means dividing it into intake, aerating and settling compartments, a supply pipe in one end wall for introducing raw sewage into the intake compartment, means for comminuting the inflowing sewage comprising a grinder in the supply pipe, a pump for supplying air under pressure in the aerating compartment, a common motor driving said pump and said comminuting means, control means for said motor, detecting means in the supply pipe for sensing the presence of sewage, and operating the motor control to control the motor in consequence thereof, baffles between the aerating and settling compartment causing the effluent to travel in a tortuous path.

2. The system as defined in claim 1 including a timer for predetermining the duration of operation of the motor.

3. The system as defined in claim 1 wherein the air supplying means comprises a compressor driven by the motor and a pipe extending vertically into the aerating compartment and having a perforated cap, a draft tube surrounding the air tube and having an outwardly flared lower end, and a conical baffle on said air pipe above the upper end of the draft tube, whereby fluids are circulated vertically through said draft tube.

4. The system as defined in claim 1, wherein the baffles include a transverse forwardly inclined divider wall between the cover and the bottom wall, a vertical wall depending from the cover and spaced from the divider wall and the bottom wall.

5. The system as defined in claim 4 including an effluent pipe in an end wall opposite thet inflow pipe, and a baffle plate rearwardly of said effluent pipe, said end wall having a downwardly inclined lower end.

6. The system as defined in claim 3 including means in the top of the tank for supplying chlorine to the treated material.

7. The system as defined in claim 6, including vent means in the top of the aerating compartment.

References Cited

UNITED STATES PATENTS

| | | | |
|---|---|---|---|
| 2,658,453 | 11/1953 | Walters | 241—185 X |
| 2,515,542 | 7/1950 | Yelloti | 241—5 X |
| 2,987,186 | 6/1961 | Burgoon | 210—220 X |
| 3,047,492 | 7/1962 | Gambrel | 210—15 X |
| 3,186,939 | 6/1965 | Murray | 210—15 X |
| 3,195,727 | 7/1965 | Kibbee | 210—221 X |
| 3,242,071 | 3/1966 | Walker | 210—135 X |
| 1,404,985 | 1/1922 | Lower | 241—200 X |

ANDREW R. JUHASZ, Primary Examiner.

FRANK T. YOST, Assistant Examiner.

U.S. Cl. X.R.

241—46, 101